US010149238B2

(12) United States Patent
Cui et al.

(10) Patent No.: US 10,149,238 B2
(45) Date of Patent: *Dec. 4, 2018

(54) FACILITATING INTELLIGENT RADIO ACCESS CONTROL

(71) Applicant: AT&T Intellectual Property I, L.P., Atlanta, GA (US)

(72) Inventors: Zhi Cui, Sugar Hill, GA (US); Alan Blackburn, Woodstock, GA (US); Sangar Dowlatkhah, Alpharetta, GA (US); Ryan Hallahan, Concord, CA (US); James W. Rembert, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 122 days.

This patent is subject to a terminal disclaimer.

(21) Appl. No.: 15/133,426

(22) Filed: Apr. 20, 2016

(65) Prior Publication Data
US 2016/0234771 A1 Aug. 11, 2016

Related U.S. Application Data

(63) Continuation of application No. 14/735,903, filed on Jun. 10, 2015, now Pat. No. 9,338,712, which is a (Continued)

(51) Int. Cl.
*H04W 48/20* (2009.01)
*H04W 48/18* (2009.01)
(Continued)

(52) U.S. Cl.
CPC ............ *H04W 48/20* (2013.01); *H04L 43/16* (2013.01); *H04L 67/306* (2013.01);
(Continued)

(58) Field of Classification Search
CPC ..... H04W 16/18; H04W 24/02; H04W 28/08; H04W 36/22; H04W 84/045;
(Continued)

(56) References Cited

U.S. PATENT DOCUMENTS 6,208,863 B1 3/2001 Salonaho
8,169,933 B2 5/2012 Srinivasan et al.
(Continued)

OTHER PUBLICATIONS

U.S. Appl. No. 14/035,267, filed Sep. 24, 2013.
(Continued)

*Primary Examiner* — Jean Gelin
(74) *Attorney, Agent, or Firm* — Amin, Turocy & Watson, LLP

(57) ABSTRACT

Intelligent radio access control selecting a first cell device of a first cell layer or a second cell device of a second cell layer or selecting a radio access technology for communication by a mobile device are provided. A device receives information indicative of an access assignment for communication. The access assignment is generated based on a defined criterion, which is associated with a policy of determining a cell layer assignment prior to determining a radio access technology (RAT) assignment. In response to receiving the information, the device can update its configuration to transmit via a transmission parameter based on the information. The cell layer assignment can offload traffic from the first cell device to the second cell device while the RAT assignment can re-assign the device from a first RAT to a second RAT. Assignment can be based on network conditions or mobility state or applications of the device.

20 Claims, 15 Drawing Sheets

Related U.S. Application Data continuation of application No. 14/035,267, filed on Sep. 24, 2013, now Pat. No. 9,084,169.

(51) Int. Cl.

| | | |
|---|---|---|
| *H04W 36/08* | (2009.01) | |
| *H04W 36/22* | (2009.01) | |
| *H04W 36/30* | (2009.01) | |
| *H04W 36/32* | (2009.01) | |
| *H04L 12/26* | (2006.01) | |
| *H04L 29/08* | (2006.01) | |
| *H04W 4/02* | (2018.01) | |
| *H04W 72/04* | (2009.01) | |
| *H04W 48/14* | (2009.01) | |

(52) U.S. Cl.
CPC ........... *H04W 4/025* (2013.01); *H04W 36/08* (2013.01); *H04W 36/22* (2013.01); *H04W 36/30* (2013.01); *H04W 36/32* (2013.01); *H04W 48/18* (2013.01); *H04W 72/048* (2013.01); *H04W 48/14* (2013.01)

(58) Field of Classification Search
CPC . H04W 16/04; H04W 16/20; H04W 36/0083; H04W 36/04; H04W 36/06; H04W 36/16; H04W 48/00; H04W 48/18; H04W 48/20
USPC ......... 455/414.1, 432.3, 434, 436, 444, 446, 455/447, 452.1, 453
See application file for complete search history.

(56) References Cited

U.S. PATENT DOCUMENTS

| | | | |
|---|---|---|---|
| 8,391,238 B2 | 3/2013 | Rune et al. | |
| 8,391,252 B2 | 3/2013 | Yang et al. | |
| 9,185,719 B2* | 11/2015 | Wietfeldt | H04W 72/1215 |
| 9,462,539 B2* | 10/2016 | Frenger | H04W 74/006 |
| 2003/0119550 A1* | 6/2003 | Rinne | H04W 36/30 |
| | | | 455/553.1 |
| 2006/0121906 A1 | 6/2006 | Stephens et al. | |
| 2010/0113010 A1* | 5/2010 | Tenny | H04L 12/66 |
| | | | 455/423 |
| 2010/0255836 A1 | 10/2010 | Chen | |
| 2011/0256884 A1* | 10/2011 | Kazmi | H04W 48/04 |
| | | | 455/456.1 |
| 2012/0087247 A1 | 4/2012 | Min et al. | |
| 2012/0184327 A1* | 7/2012 | Love | H04B 1/0064 |
| | | | 455/552.1 |
| 2012/0207040 A1* | 8/2012 | Comsa | H04W 72/1215 |
| | | | 370/252 |
| 2012/0263145 A1 | 10/2012 | Marinier et al. | |
| 2013/0023301 A1 | 1/2013 | Wang et al. | |
| 2013/0102313 A1* | 4/2013 | Tinnakornsrisuphap | |
| | | | H04W 36/22 |
| | | | 455/436 |
| 2014/0031047 A1 | 1/2014 | Jovanovic et al. | |
| 2014/0141788 A1 | 5/2014 | Puthenpura et al. | |
| 2014/0155070 A1 | 6/2014 | Ljung | |
| 2014/0155078 A1 | 6/2014 | Balageas et al. | |
| 2016/0073287 A1* | 3/2016 | Himayat | H04W 48/18 |
| | | | 370/236 |
| 2016/0157161 A1* | 6/2016 | Miao | H04W 64/00 |
| | | | 455/434 |
| 2016/0183281 A1* | 6/2016 | Yeh | H04W 28/24 |
| | | | 370/332 |
| 2016/0277974 A1* | 9/2016 | Persson | H04W 48/16 |
| 2017/0257792 A1* | 9/2017 | Kim | H04W 74/08 |

OTHER PUBLICATIONS

U.S. Appl. No. 14/735,903, filed Jun. 10, 2015.

Kwon et al., "ANDSF-based Congestion Control Procedure in Heterogeneous Networks," 2013 International Conference on Information Networking (ICOIN), Jan. 28-30, 2013, pp. 547-550.

Tomici et al., "Multi-RAT Traffic Offloading Solutions for the Bandwidth Crunch Problem" 2011 IEEE Long Island Systems, Applications and Technology Conference (LISAT), May 6, 2011, 6 pages.

Song et al., "Improvements to Seamless Vertical Handover between Mobile WiMAX and 3GPP UTRAN through the Evolved Packet Core" published under LTE Part II: 3GPP Release 8 in IEEE Communications Magazine, Apr. 2009, pp. 66-73.

Office Action dated Nov. 19, 2014 for U.S. Appl. No. 14/035,267, 17 pages.

Office Action dated Jul. 15, 2015 for U.S. Appl. No. 14/735,903, 15 pages.

\* cited by examiner

FACILITATING INTELLIGENT RADIO ACCESS CONTROL

RELATED APPLICATION

This application is a continuation of, and claims priority to each of, U.S. patent application Ser. No. 14/735,903 (now U.S. Pat. No. 9,338,712), filed Jun. 10, 2015, and entitled "FACILITATING INTELLIGENT RADIO ACCESS CONTROL," which is a continuation of U.S. patent application Ser. No. 14/035,267 (now U.S. Pat. No. 9,084,169), filed on Sep. 24, 2013, and entitled "FACILITATING INTELLIGENT RADIO ACCESS CONTROL," the entireties of which applications are respectively hereby incorporated herein by reference.

TECHNICAL FIELD

The subject disclosure relates generally to wireless networks, and specifically to facilitating intelligent radio access control in wireless networks.

BACKGROUND

Mobile device traffic has grown exponentially and the trend is for continued growth at the same or greater rates. However, rampant growth places a strain on bandwidth and the ability for service providers to provide desirable end user experience.

DETAILED DESCRIPTION

Figure 1:
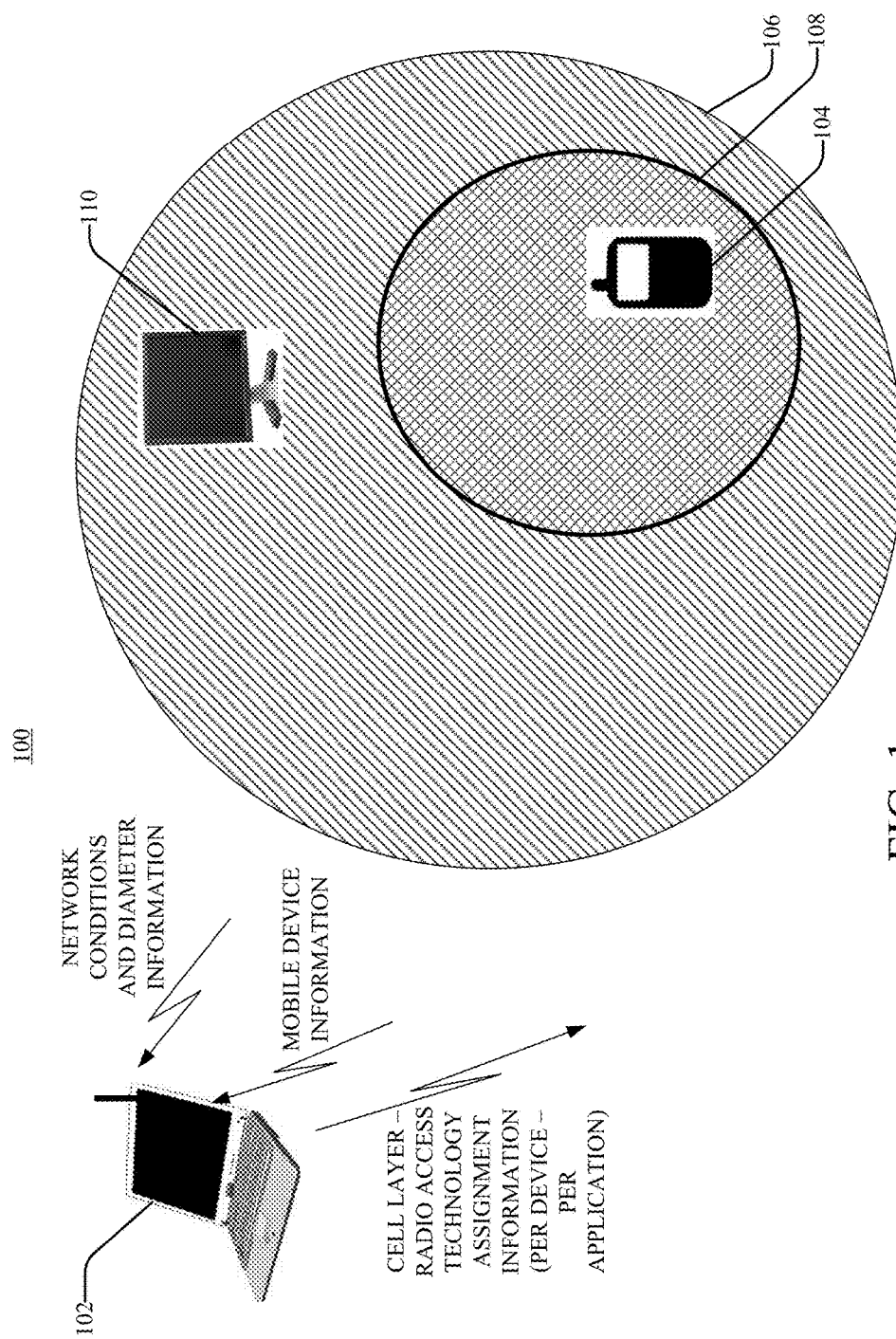
FIG. 1 illustrates an example block diagram of a system configured to facilitate intelligent radio access control in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as method, system, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS), femto cell device," "Node B (NB)," "evolved Node B (eNode B)," "home Node B (HNB)," "metro cell device," "micro cell" and "macro cell device" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows. Further, the terms "femto" and "femto cell", the terms "macro" and "macro cell," and the terms "micro" and "micro cell" are used interchangeably.

Furthermore, the terms "mobile device," "subscriber," "customer," "consumer," "end user" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Due to bandwidth strain and poor user experience from rampant growth in wireless communications, managing and balancing radio access control to improve end user experience is desired. Embodiments described herein can be used in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

The embodiments described herein provide methods, systems and apparatus facilitating intelligent access control based on selection of cell layer (e.g., macro cell, micro cell or metro cell) and based on radio access technology (RAT) type. The selection can be made to facilitate efficient use of bandwidth notwithstanding the ever-increasing mobile device traffic and corresponding strain on resources.

In one or more of the embodiments described herein, for example, an intelligent controller device can select cell layer and/or radio access technology (RAT) for communication by a mobile device. For example, the controller device can intelligently select a cell layer that is associated with a macro cell device, a micro cell device or a metro cell device. Similarly, if selection of a particular cell layer (and corresponding offloading of mobile traffic from a first cell device of a first cell layer to a second cell device of a second cell layer) does not result in satisfactory balanced bandwidth conditions (which can be determined by the service provider and/or determined based on whether end user quality of service requirements can be met), controller device can intelligently select a RAT that is UMTS, LTE or Wi-Fi depending on various network conditions, policy rules and/or subscriber preferences, application type or mobility state. By way of example, but not limitation, controller device selection of cell layer and/or RAT for a mobile device can be based on application type being executed on (or needed for execution of an application by) the mobile device, the mobility state (e.g., speed of movement or non-movement of the mobile device), dynamic network conditions (e.g., bandwidth, loading, latency, network size (e.g., diameter of coverage area)), subscriber profile (e.g., usage history, quality of service purchased) and/or policy rules in view of application type, mobility state, network conditions, etc. As such, selection can be performed on a per device per application basis based on device and network intelligence.

In one embodiment, a method includes: receiving, by a device comprising a processor, information indicative of an access assignment for communication by the device, wherein the access assignment is generated based on defined criterion, wherein the defined criterion is associated with a policy of determining a cell layer assignment prior to determining a radio technology assignment; and in response to the receiving, adjusting, by the device, a configuration of the device to transmit via a transmission parameter based on the information.

In another embodiment, an apparatus includes: a memory to store executable instructions; and a processor, coupled to the memory, which facilitates execution of the executable instructions to perform operations. The operations can include: receiving information indicative of an access assignment for communication by the apparatus, wherein the access assignment is generated based on a defined criterion associated with a policy of determining a cell layer assignment and determining a radio technology assignment. The method can also include, in response to the receiving, updating a configuration of the apparatus to transmit via a transmission parameter based on the information.

In another embodiment, another method includes: generating, by a device, information indicative of an access assignment for communication by a mobile device, wherein the generating is based on defined criterion, wherein the defined criterion is associated with a policy of determining a cell layer assignment prior to determining a radio technology assignment. The method can also include initiating, by the device, a transmission of the information to the mobile device.

One or more embodiments can advantageously provide efficient utilization of bandwidth for multiple mobile devices and thereby increase end user experience. The efficient utilization of bandwidth can be achieved through intelligent selection of one of many different RATs and/or one of different cell layers. For example, one or more embodiments can advantageously allow mobile service providers to leverage Wi-Fi technology/assets and integrate the technology seamlessly with cellular networks of mobile service providers to improve overall system capacity by optimally using radio resources. Any mobile service providers can leverage this approach for seamless Wi-Fi and cellular integration and provide optimal user experience.

FIG. 1 illustrates an example block diagram of a system configured to facilitate intelligent radio access control in accordance with one or more embodiments described herein. System 100 can include controller device 102, mobile devices 104, 110, first network 106, and second network 108. Mobile devices 104, 110 can be communicatively coupled to one another. Mobile devices 104, 110 can also be coupled to controller device 102 such that mobile devices 104, 110 can receive information indicative of RAT and cell layer assignments for communication of mobile devices 104, 110 on first network 106 or second network 108. Mobile devices 104, 110 are configurable to communicate on first network 106 and/or second network 108 in various embodiments based on the selection made by controller device 102 in some embodiments (or, as described with reference to FIG. 5, based on selection made by mobile devices 104, 110).

In one embodiment, the diameter of the coverage area of first network 106 is on the order of miles while the diameter of the coverage area of second network 108 is on the order of hundreds of feet. For example, in some embodiments, first network 106 is a cellular network having a range of several miles while second network 108 is a Wi-Fi network having a range of approximately 200 feet.

In some embodiments, second network 108 could be any network utilizing unlicensed bandwidth while first network 106 is any network using licensed bandwidth. In this embodiment, for example, first network 106 could be a metro cell while second network 108 could be a femto cell.

In some embodiments, second network 108 could be any network having an average larger available bandwidth but a smaller coverage area relative first network 106. For example, in this embodiment also, first network 106 could be a cellular network while second network 106 could be a Wi-Fi network.

In various embodiments, first network 106 and second network 108 can carry different types of traffic (e.g., voice, video, data, traffic for real-time applications, traffic for non-real-time applications, etc.). In some embodiments, there are numerous networks similar to second network 108 in size or bandwidth capacity overlapping with the coverage area of first network 106. Accordingly, a mobile device (e.g., mobile device 104) can be assigned to first network 106 or second network 108 within the coverage area of first network 106.

Figure 2:
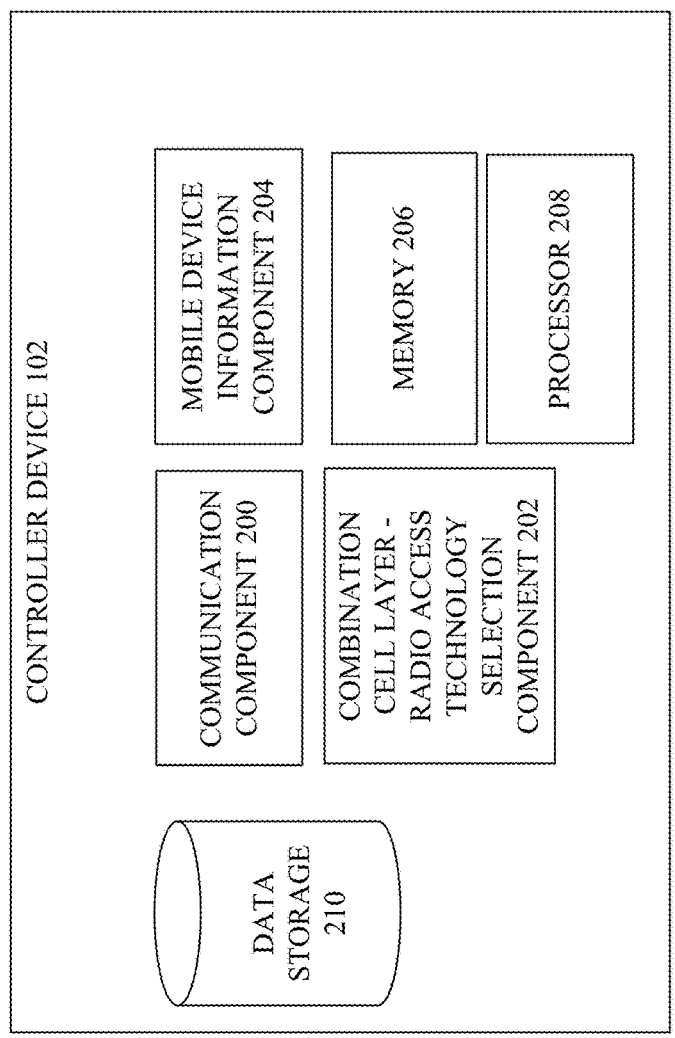
FIG. 2 illustrates an example block diagram of a controller device configured to facilitate intelligent radio access control in accordance with one or more embodiments described herein.
Figure 3:
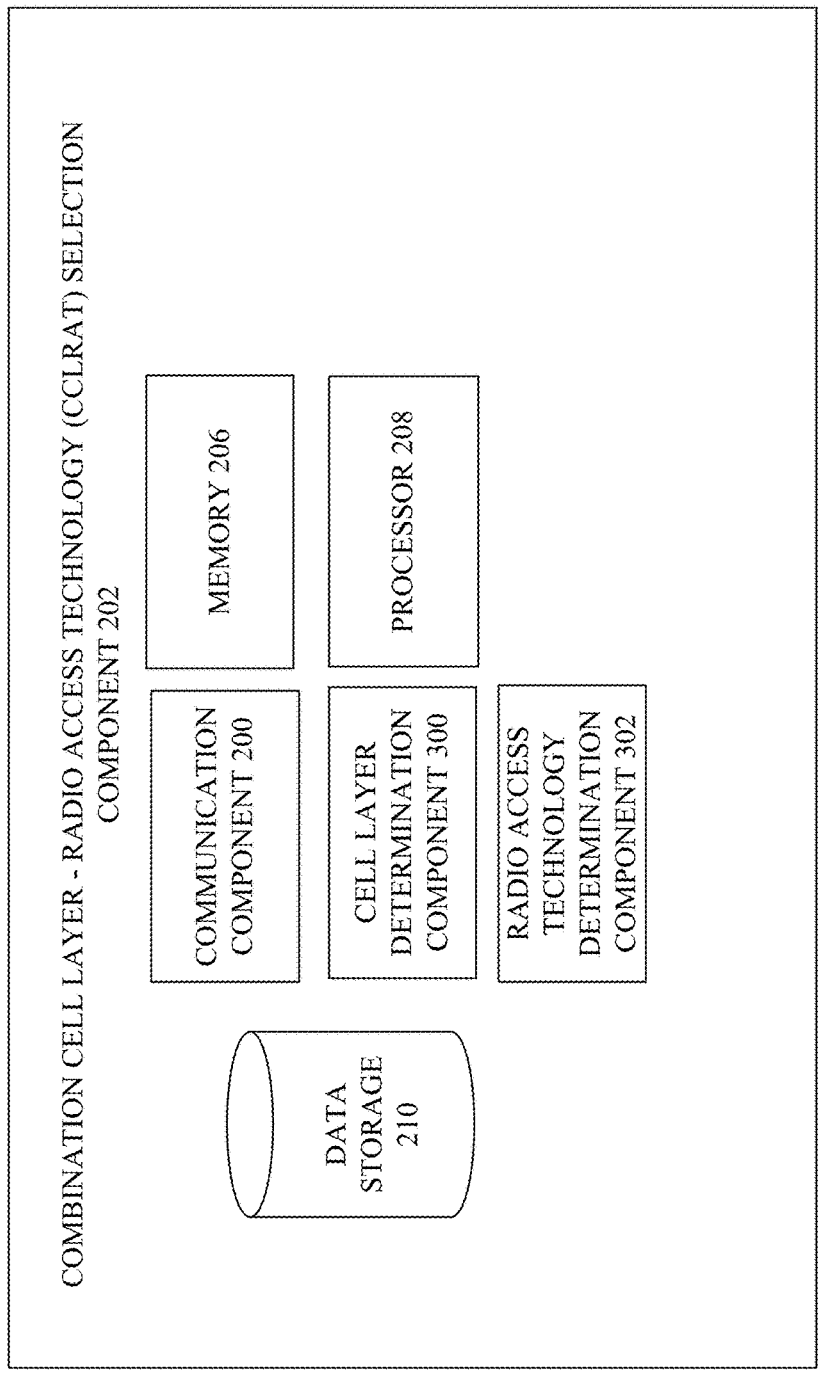
FIG. 3 illustrates an example block diagram of a combination cell layer—radio access technology selection component of a controller device configured to facilitate intelligent radio access control in accordance with one or more embodiments described herein.
Figure 4:
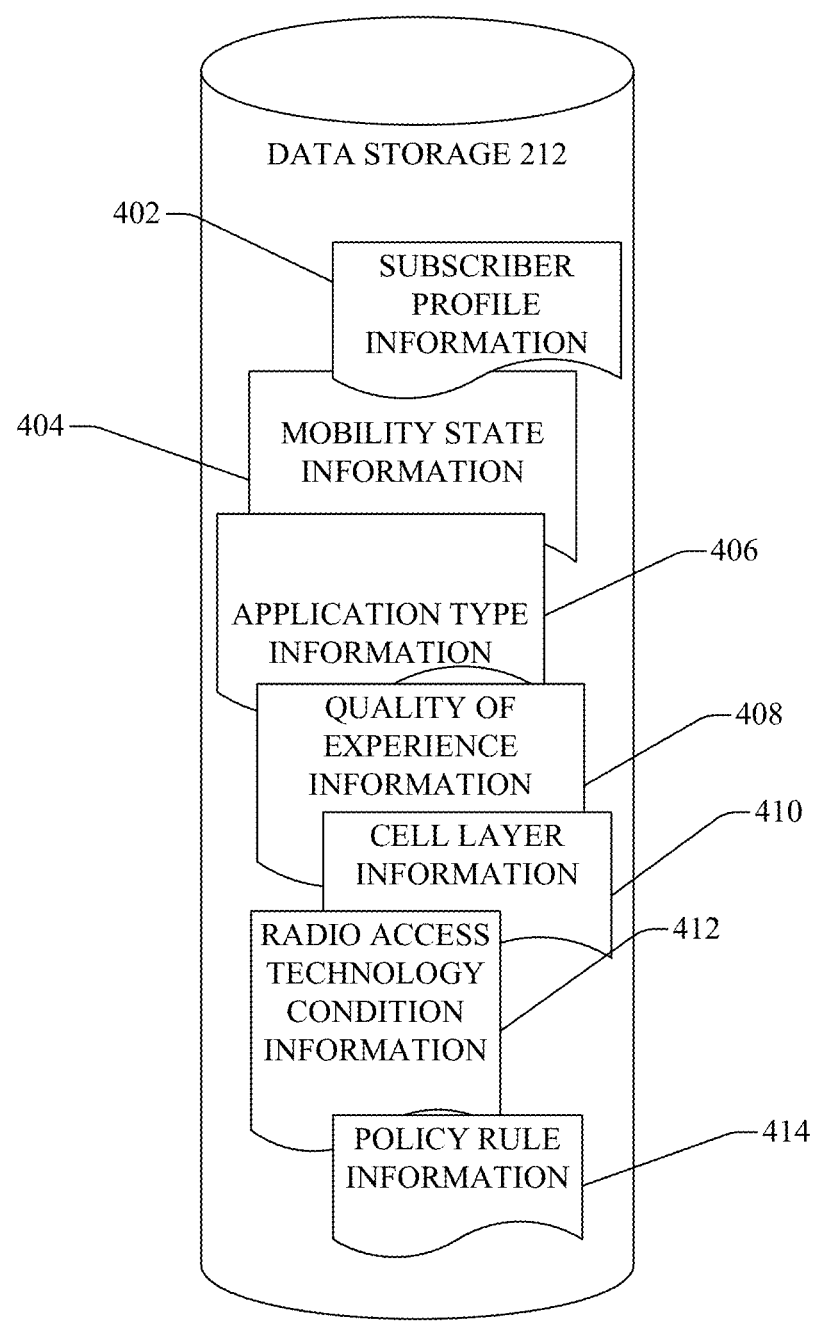
FIG. 4 illustrates an example block diagram of data storage of the controller device of FIG. 2 in accordance with embodiments described herein.

Controller device 102 can be configured to intelligently allocate a cell layer and, if balancing of available bandwidth does not result with allocation of cell layer, controller device 102 can intelligently allocate a RAT. Controller device 102 will now be described in greater detail with reference to FIGS. 2, 3 and 4. FIG. 2 illustrates an example block diagram of a controller device configured to facilitate intelligent radio access control in accordance with one or more embodiments described herein. FIG. 3 illustrates an example block diagram of a combination cell layer—radio access technology selection component of a controller device configured to facilitate intelligent radio access control in accordance with one or more embodiments described herein. FIG. 4 illustrates an example block diagram of data storage of the controller device of FIG. 2 in accordance with embodiments described herein. Repetitive description of like elements employed in respective embodiments of systems and/or apparatus described herein are omitted for sake of brevity.

Turning first to FIG. 2, one embodiment of controller device 102 is shown. Controller device 102 includes communication component 200, combination cell layer—radio access technology selection (CCLRAT) component 202, mobile device information component 204, memory 206, processor 208 and/or data storage 210. In various embodiments, one or more of communication component 200, CCLRAT selection component 202, mobile device information component 204, memory 206, processor 208 and/or data storage 210 can be communicatively and/or electrically coupled to one another to perform one or more functions of controller device 102.

With reference to FIGS. 1 and 2, communication component 200 can transmit and/or receive information to and/or from mobile devices 104, 110 and/or first network 106 and second network 108. For example, in various embodiments, communication component 200 can transmit and/or receive network condition information for first network 106 and/or second network 108 including, but not limited to, loading (e.g., congestion), diameter of coverage area, bandwidth and/or latency information from first network 106 or second network 108. Communication component 200 can also transmit and/or receive mobile device information including, but not limited to, subscriber profile information (e.g., quality of service information, quality of user experience feedback information), application type information (e.g., real-time application, non-real-time application) associated with an application that a mobile device is executing or preparing to execute or the like. For these functions, communication component 200 can include a transceiver, transmitter and/or receiver in various embodiments.

CCLRAT selection component 202 can determine information for assigning a mobile device to a first cell device of a first cell layer or a second cell device or second cell layer and/or for assigning a mobile device to a particular RAT. For example, first network 106 can be associated with a first RAT (e.g., cellular network) while second network 108 can be associated with a second RAT (e.g., Wi-Fi). CCLRAT selection component 202 can determine the cell layer and RAT to which mobile device 104, for example, should be assigned, and generate information for communication to mobile device 104 via communication component 200.

Mobile device information component 204 can receive and/or process information about mobile device 104 including, but not limited to, subscriber profile information (e.g., quality of service information, quality of user experience feedback information), application type information associated with a type of application that a mobile device is executing or preparing to execute or the like.

The information employed by CCLRAT selection component 202 can include, but is not limited to, network information for first network 106, second network 108 and/or mobile device 104 information.

Memory 206 can be a computer-readable storage medium storing computer-executable instructions and/or information for performing the functions described herein with reference to controller device 102 (or any component of controller device 102). For example, memory 206 can store computer-executable instructions that can be executed by processor 208 to determine a cell layer and/or RAT for assignment to mobile device 104. Processor 208 can perform one or more of the functions described herein with reference to controller device 102 (or any component thereof). For example, processor 208 can process network loading, bandwidth or diameter information, subscriber information, and/or generate information identifying a cell layer and/or RAT for assignment to a mobile device.

Data storage 210 can be described in greater detail with reference to FIG. 4. As shown in FIG. 4, data storage 210 can be configured to store information accessed by, received by and/or processed by controller device 102. For example, data storage 210 can store subscriber profile information 402 such as information about a quality of service purchased or desired by an end user and end user preferences regarding cell layer and RAT assignment. As another example, data storage 210 can store mobility state information 404 such as information regarding the speed of a mobile device (e.g., mobile device 104) and/or whether the mobile device is stationary or moving. As another example, data storage 210 can store application type information 406 such as information indicative of the type of application (e.g., real-time, non-real time, video) a mobile device is executing or planning to execute. As another example, data storage 210 can store quality of experience information 408 such as information detailing feedback from a mobile device about past end user experience. As another example, data storage 210 can store cell layer information 408 such as information about cell layers that are within a particular geographic area in which a mobile device (e.g., mobile device 104) is located. As another example, data storage 210 can store RAT condition information 412 such as information detailing current or historical loading, bandwidth, latency or diameter information. As another example, data storage 210 can store policy rule information 414 such as information detailing policies/rules for selecting cell layers and RAT for mobile devices.

Turning now to FIG. 3, shown is an example block diagram of a CCLRAT selection component of a controller device configured to facilitate intelligent radio access control in accordance with one or more embodiments described herein. CCLRAT selection component 202 includes communication component 200, cell layer determination component 300, RAT determination component 302, memory 206, processor 208 and/or data storage 210. One or more of communication component 200, cell layer determination component 300, RAT determination component 302, memory 206, processor 208 and/or data storage 210 can be communicatively and/or electrically coupled to one another to perform one or more functions of CCLRAT selection component 202. Repetitive description of like elements employed in respective embodiments of systems and/or apparatus described herein are omitted for sake of brevity.

Cell layer determination component 300 can determine a cell layer to which a mobile device will be assigned while RAT determination component 302 can determine an RAT to which the mobile device will be assigned. Mobile device assignment component 304 can receive the selected cell layer and the selected RAT and format the information for transmission by communication component 200 to mobile device 104.

In various embodiments, CCLRAT selection component 202 can perform assignment of cell layer and/or RAT based on dynamic changes in network conditions, mobile device application type, preference or other information. By way of examples, but not limitation, CCLRAT selection component 202 can perform the allocation/assignment of cell layer and/or RAT at defined intervals (every 48 hours, every 4 hours), upon the occurrence of an event (e.g., network loading or latency conditions exceeding a defined threshold, available network bandwidth falling below a defined threshold) and/or at random intervals. In some embodiments, CCLRAT selection component 202 can re-assign cell layer and RAT when available bandwidth, latency and/or loading conditions are satisfactory (e.g., meet or exceed a defined threshold).

The CCLRAT selection component 202 can balance bandwidth by assignment of one or more mobile devices (and corresponding traffic) to a particular cell layer for communication while maintaining other mobile device assignments with other cell layers. For example, if a mobile device is able to be associated with more than one cell layer, CCLRAT selection component 202 can assign a particular cell layer to offload traffic from one cell layer to another cell layer. If balancing continues to be needed, CCLRAT selection component 202 can then balance bandwidth by assignment of RAT.

CCLRAT selection component 202 can allocate a RAT and/or cell layer to mobile device 104 based on one or more different attributes of first network 106, second network 108 and/or mobile devices 104, 110. For example, CCLRAT selection component 202 can perform selection of RAT and cell layer for mobile device 104 or mobile device 110 based on application type being executed on (or needed for execution of an application by) mobile device 104 or mobile device 110, the mobility state of mobile device 104 or mobile device 110 (e.g., speed of movement or non-movement of mobile device 104 or mobile device 110), dynamic network conditions of first network 106 or second network 108 (e.g., bandwidth, loading, latency, network size (e.g., diameter)), subscriber profile for user of mobile device 104 or mobile device 110 (e.g., usage history, quality of service purchased by subscriber) and/or a defined policy in view of application type, mobility state, network conditions, etc. As such, assignment (and re-assignment) can be dynamically performed on a per device per application basis based on device and network intelligence.

In some embodiments, cell layer determination component 300 can be employed by CCLRAT selection component 202 prior to employing RAT determination component 302. For example, cell layer determination component 300 can receive information about traffic on a first cell device of a first cell layer and traffic on a second cell device of a second cell layer. Cell layer determination component 300 can offload traffic from one cell layer to the other cell layer until traffic conditions or loading or available bandwidth is balanced between the cell layers (or, in some embodiments, meets or exceeds a defined threshold).

For example, the first cell device of the first cell layer can be associated with a coverage area diameter of several kilometers (e.g., macro cell) while the second cell device of the second cell layer can be associated with a coverage area diameter of a few hundred meters (e.g., micro cell). In various embodiments, other types of cell layers can be provided as well including, but not limited to, a metro cell.

Accordingly, a multi-tier system can be provided such that numerous cell layers of a defined coverage area overlap on a cell layer of a larger coverage area than the defined coverage area.

In some embodiments, if mobility state of mobile device 104 is such that mobile device 104 is moving at a speed greater than a defined threshold, cell layer determination component 300 can select a larger cell layer as between a first cell layer and a second cell layer to reduce the chance of interruption of service (since the speed of movement of mobile device 104 can increase the likelihood that mobile device 104 will move outside of coverage area of the cell layer sooner than if the cell layer is smaller).

In some embodiments, cell layer determination component 300 can assign mobile device 104 to a first cell device of a first cell layer or a second cell device of a second cell layer based on end user preference. For example, an assignment can be made based on whether the user of mobile device 104 prefers to be assigned to first cell device of the first cell layer or second cell device of the second cell layer—notwithstanding the mobility state of mobile device 104 or the application type being executed on mobile device 104 or the quality of service purchased by mobile device 104. In this manner, cell layer determination component 300 can select a macro cell, micro cell or metro cell for mobile device 104 based on policy or user preference (as example, although other bases for selection of different cell layers are also possible and envisaged).

RAT determination component 302 can assign a RAT to the mobile device based on network information, mobile device information and/or numerous different policies. Specifically, RAT determination component 302 can employ mobile device 104 and network intelligence regarding one or more of application type, mobility state, network condition and/or subscriber profile.

For example, one policy can be to perform assignment according to preference of the end user operating mobile device 104. For example, RAT determination component 302 can assign mobile device 104 to first network 106 or second network 108 based on whether the user of mobile device 104 prefers to be assigned to first network 106 or second network 108—notwithstanding the network conditions of first network 106 or second network 108. In some embodiments, RAT determination component 302 has a policy of always confirming whether there is a user preference and implementing the user preference as the first priority in RAT and cell layer determination.

As another example, another policy can be based on a level of loading (e.g., congestion) in first network 106. In this embodiment, if first network 106 has a level of congestion that is greater than a defined value, RAT determination component 302 can re-assign a mobile device 104 assigned to communicate over first network 106 to second network 108.

Another policy can be based on a combination of a level of loading in first network 106 and an application type being executed by a mobile device in first network 106. In this embodiment, if first network 106 has a level of congestion that is greater than a defined value, and a first mobile device (e.g., mobile device 104) is currently executing a real-time application (e.g., real-time video) and a second mobile device (e.g., mobile device 110) is currently on a voice call, controller device 102 can re-assign mobile device 104 executing the real-time application to second network 108. Controller device 102 can continue to allow mobile device 110 that is currently on the voice call to remain in first network 106 since users of real-time applications may be less tolerant of interruptions in service than users on voice calls.

Another policy can be based on a quality of service purchased by an end user of mobile device 104. For example, in this embodiment, if the end user for mobile device 104 has purchased basic service and not premium service, if second network 108, such as a Wi-Fi network, is available, controller device 102 can move mobile device 104 from first network 106 to second network 108 and maintain first network 106 (e.g., cellular network) for mobile devices associated with premium service. Controller device 102 can apply this policy because maintaining mobile device 104 with premium service in the cellular network can enable more efficient use of the cellular network.

Another policy can be based on the mobility state of a mobile device and/or corresponding reliability resultant from a mobility state. For example, if the mobility state of mobile device 104 is such that mobile device 104 is moving at high speed, controller device 102 can maintain mobile device 104 on first network 106 or re-assign mobile device 104 to first network 106 from second network 108 since allowing mobile device 104 to stay connected to second network 108 or assignment of mobile device 104 to second network 108 would have a greater likelihood of resulting in a state in which interruption of service will occur because second network 108 has a smaller coverage area than first network 106. As a result, reliability would suffer by re-assigning a fast moving mobile device to the second network. As an example, if mobile device 104 is currently on a voice call, and is on first network 106, and first network is of a larger coverage area than second network 108, and has a mobility state that indicates mobile device 104 is moving at high speed, controller device 102 can maintain mobile device 104 on first network 106 because movement to second network 108 may result in mobile device 104 being outside of coverage area of second network 108 sooner than mobile device 104 would be outside of the coverage area of first network 106 (since the coverage area of second network 108 is less than the coverage area of first network 106) and therefore the voice call currently in progress at mobile device 104 would have a greater likelihood of being dropped if controller device 102 moved mobile device 104 to second network 108.

If the mobility state of mobile device 104 is such that mobile device 104 is stationary or moving at a speed less than a defined threshold, controller device 102 can maintain mobile device 104 on second network 108 or re-assign mobile device 104 to second network 108 from first network 106 since allowing mobile device 104 to stay connected to second network 108 or assignment of mobile device 104 to second network 108 would likely allow facilitation of continued service although the coverage area of second network 108 is small.

Another policy can be to move mobile device 104 to first network 106 or second network 108 having most favorable bandwidth, loading and/or latency conditions. For example, controller device 102 can determine available bandwidth of first network 106 and second network 108. Controller device 102 can assign mobile device 104 to whichever network has the most available bandwidth.

As another example, controller device 102 can determine latency in first network 106 and second network 108. Controller device 102 can assign mobile device 104 to whichever network lower latency. In some embodiments, certain types of networks can be preferred for assignment over other networks due to latency typically experienced in the network. For example, as between UMTS and LTE networks, an LTE network can have a higher priority for assignment (and therefore controller device 102 will prefer to assign a mobile device to an LTE over a UMTS network) because an LTE network typically has lower latency than a UMTS network.

Similarly, as between 3GPP networks and Wi-Fi networks, a 3GPP network can have a higher priority for assignment (and therefore controller device 102 will prefer to assign a mobile device to a 3GPP network over a Wi-Fi network) because a Wi-Fi network might have additional interference not present in a 3GPP network since the Wi-Fi network operates in unlicensed spectrum.

Figure 5:
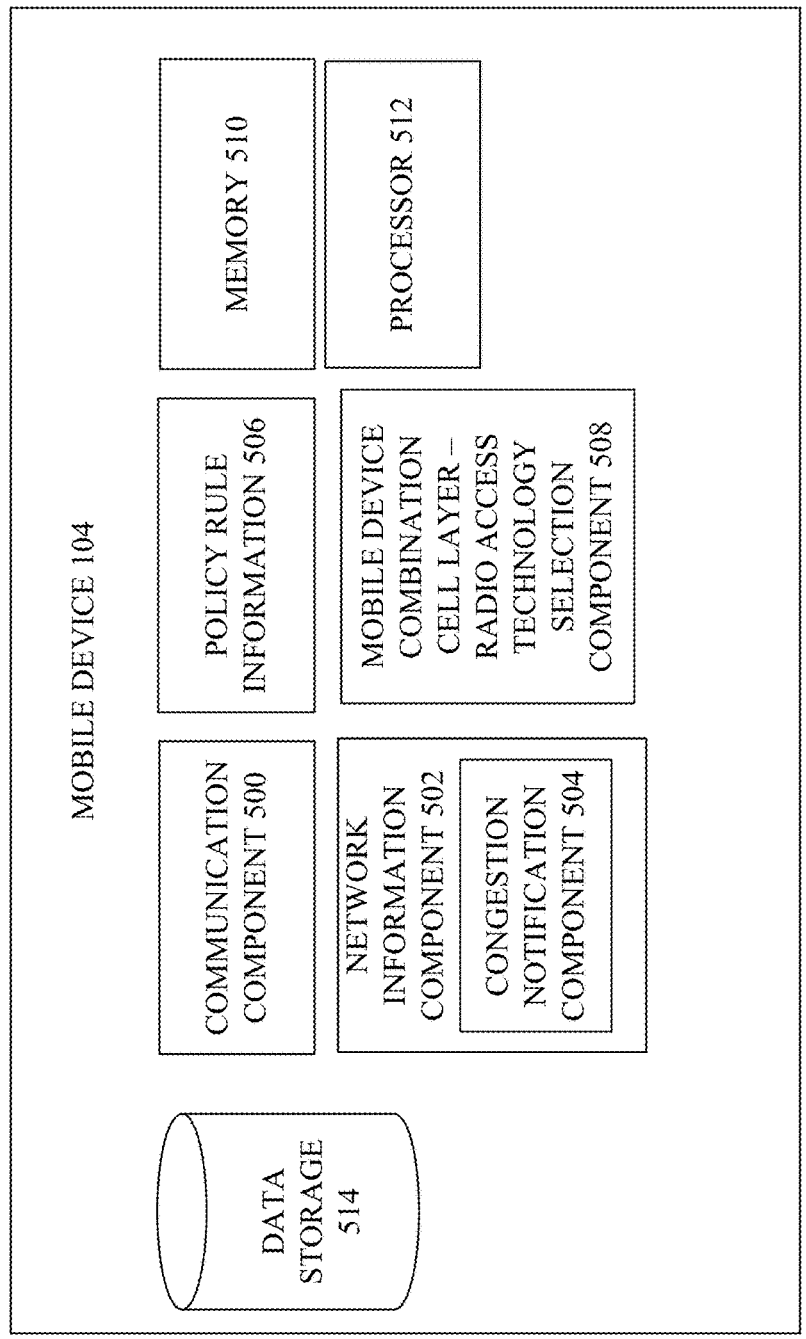
FIG. 5 illustrates an example block diagram of a mobile device in accordance with one or more embodiments described herein.
Figure 6:
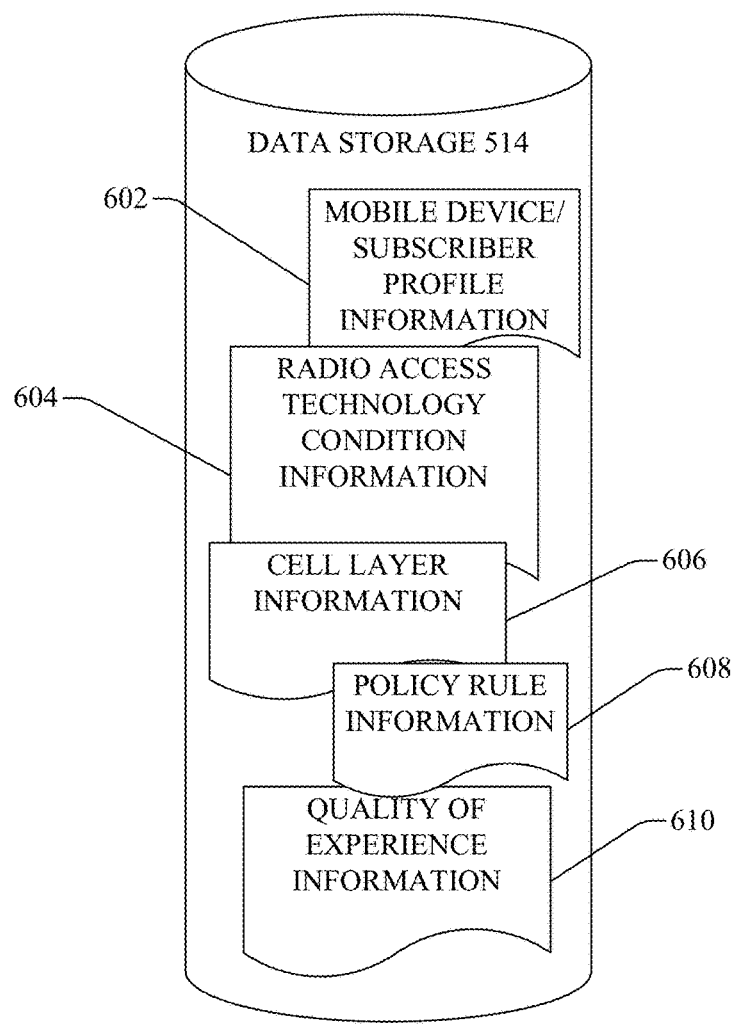
FIG. 6 illustrates an example block diagram of data storage of the mobile device of FIG. 5 in accordance with embodiments described herein.

FIG. 5 illustrates an example block diagram of a mobile device in accordance with one or more embodiments described herein. FIG. 6 illustrates an example block diagram of data storage of the mobile device of FIG. 5 in accordance with embodiments described herein. Repetitive description of like elements employed in respective embodiments of systems and/or apparatus described herein are omitted for sake of brevity.

Mobile device 104 can include communication component 500, network information component 502 (including congestion notification component 504), policy rule information 506, mobile device CCLRAT (MDCCLRAT) selection component 508, memory 510, processor 512 and/or data storage 514. One or more of communication component 500, network information component 502 (including congestion notification component 504), policy rule information 506, mobile device CCLRAT (MDCCLRAT) selection component 508, memory 510, processor 512 and/or data storage 514 can be communicatively and/or electrically coupled to one another to perform one or more functions of mobile device 104.

Communication component 500 can transmit and/or receive information to and/or from first network 106, second network 108, controller device 102 and/or mobile device 110. For example, in various embodiments, communication component 500 can transmit and/or receive mobility state information or application type information to controller device 102 for determination of cell layer and/or RAT assignment of mobile device 500. In some embodiments, mobile device 500 can determine cell layer and/or RAT assignment based on network information, policy rules for assignment of cell layer and/or RAT and/or based on preferences, mobility state, application type executing on (or preparing to execute on) mobile device 104.

In some embodiments, communication component 500 can receive information from first network 106 and/or second network 108 regarding the bandwidth, and/or latency of the networks and/or the diameter of the coverage areas of the networks. In some embodiments, communication component 500 can also receive congestion information for the first network 106 and the second network 108. For example, a router in first network 106 and/or second network 108 can generate information indicative of congestion prior to queue overflow. Mobile device 104 can determine cell layer and/or RAT for communication of mobile device 104 based on the information received from first network 106 and/or second network 108, and one or more type of information stored in data storage 514. For these functions, communication component 500 can include a transceiver, transmitter and/or receiver in various embodiments.

In some embodiments, communication component 500 can include structure and/or functionality to discovery a network (e.g., first network 106 or second network 108) when mobile device 104 is in a coverage area of the first network 106 or the second network 108). After discovery of the network, communication component 500 can receive information about the network.

Network information component 502 can process information received from or about first network 106 and/or second network 108. For example, in some embodiments, information can be received from an intermediary device configured to communicate with both first network 106 and mobile device 104 and/or mobile device 104 can receive information directly from first network 106 and/or second network 108. The information about the network can include, but is not limited to, loading (e.g., congestion), diameter of coverage area, bandwidth and/or latency information from first network 106 or second network 108. In some embodiments, congestion notification component 504 can analyze information indicative of congestion in first network 106 and/or second network 108 and/or first cell device of the first cell layer or second cell device of the second cell layer.

Policy rule information 508 can implement any of the policies for selection of cell layer or RAT described herein. The policies can be based on information stored in or accessed by data storage 514, network information received or accessed by mobile device 104 and/or policy information.

Data storage 512 can be described in greater detail with reference to FIG. 6. As shown in FIG. 6, data storage 512 can be configured to store information accessed by, received by and/or processed by mobile device 104. For example, data storage 512 can store mobile device/subscriber profile information 602 such as information about a quality of service purchased or desired by an end user and end user preferences regarding cell layer and RAT assignment, application type information such as information indicative of the type of application (e.g., real-time, non-real time, video) mobile device 104 is executing or planning to execute, and/or mobility state information such as information regarding the speed of mobile device 104 and/or whether mobile device 104 is stationary or moving.

As another example, data storage 512 can store quality of experience information 610 such as information detailing feedback from a mobile device about past end user experience. As another example, data storage 512 can store cell layer information 606 such as information about cell layers that are within a particular geographic area in which mobile device 104 is located. As another example, data storage 512 can store RAT condition information 604 such as information detailing current or historical loading, bandwidth, latency or diameter information from one or more different RATs. As another example, data storage 512 can store policy rule information 608 such as information detailing policies/rules for selecting cell layers and RAT for mobile devices.

Turning back to FIG. 5, MDCCLRAT selection component 508 can determine information for selecting a first cell device of a first cell layer or a second cell device of a second cell layer and/or for assigning a mobile device to a particular RAT for communication by mobile device 104. MDCCLRAT selection component 508 can various different functions described with reference to CCLRAT selection component 202. For example, MDCCLRAT selection component 508 can receive network information and apply one or more policy rules (described with reference to CCLRAT selection component 202) and/or subscriber or mobile device information to determine the cell layer and/or RAT for communication by mobile device 104.

Memory 510 can be a computer-readable storage medium storing computer-executable instructions and/or information for performing the functions described herein with reference to mobile device 104 (or any component of mobile device 104). For example, memory 510 can store computer-executable instructions that can be executed by processor 512 to determine a cell layer and/or RAT for assignment to mobile device 104. Processor 512 can perform one or more of the functions described herein with reference to mobile device 104 (or any component thereof). For example, processor 512 can process network loading, bandwidth or diameter information, subscriber information, and/or generate information identifying a cell layer and/or RAT for selection by mobile device 104.

Figure 7:
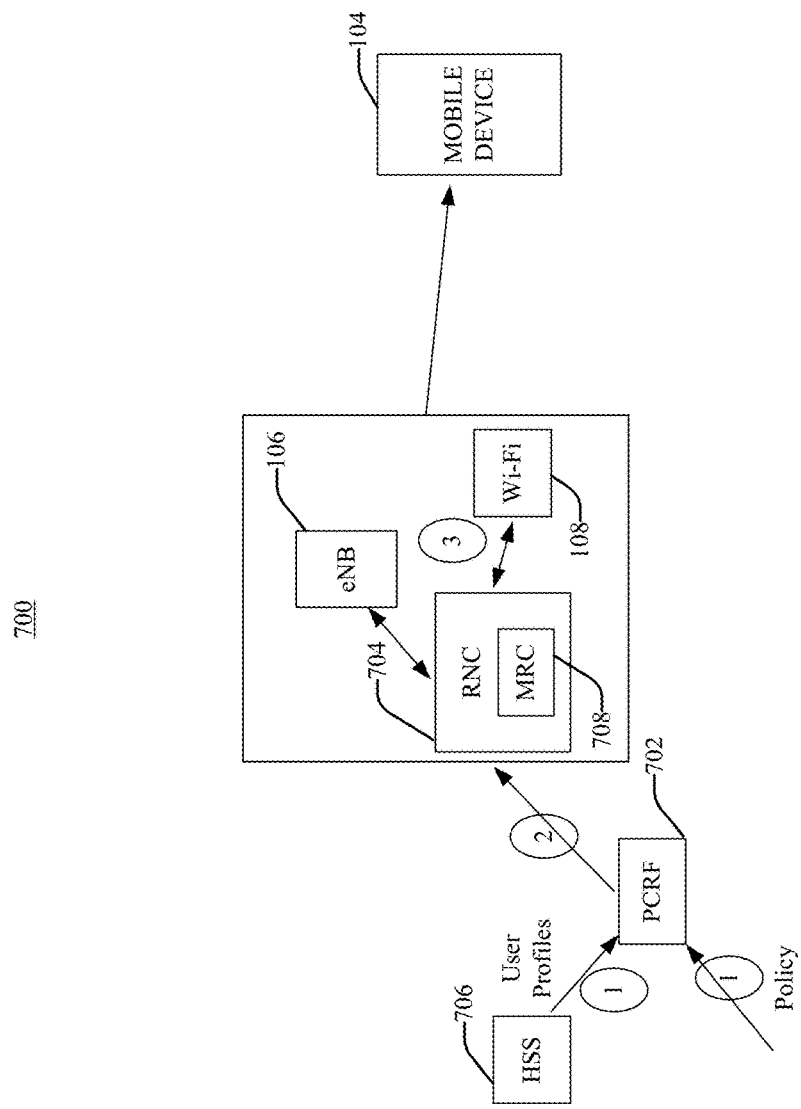
FIG. 7 illustrates an example block diagram of a system configured to facilitate intelligent radio access control via network coordinated decision-making in accordance with one or more embodiments described herein.

Different frameworks for intelligent determination of RAT and cell layers can be provided with reference to FIGS. 7, 8, 9 and 10. Turning first to FIG. 7, shown is an example block diagram of a system configured to facilitate intelligent radio access control via network coordinated decision-making in accordance with one or more embodiments described herein.

Network 700 can include policy charging and rules function (PCRF) component 702, radio network controller (RNC) component 704, home subscriber server (HSS) 706 and/or multi-radio control (MRC) component 708. Further, in various embodiments, one or more of the structure and/or functionality can be similar to or the same as that described with reference to controller device 102 (or component thereof). In some embodiments, one or more PCRF component 702, RNC component 704, HSS 706 and/or MRC component 708 can include structure and/or functionality of corresponding components associated with 3GPP networks. In this embodiment shown and described in FIG. 7, the framework for the system provides for network 700 to make a coordinated decision regarding cell layer and/or RAT. Specifically, MRC component 708 of network 700 can make a coordinated decision regarding cell layer and/or RAT and, as such, the intelligence decision structure and/or functionality can reside in MRC component 708. While FIG. 7 illustrates MRC component 708 residing at radio network controller (RNC) component 704, in various embodiments, MRC component 708 can reside at other locations in network 700. For example, in FIG. 8, MRC component 708 is provided at a location distinct from the location of RNC component 704.

While controller device 102 was presented as a single entity, in various embodiments, structure and/or functionality described with reference to controller device 102 can be provided in a distributed fashion via two or more components in a network, such as that shown in networks 700 and 900 in FIGS. 7, 8, 9 and/or 10. Similarly, HSS can provide profile information for mobile device 104 and/or, in some embodiments, profile information can be stored in one or more components of network 700 or 900 or received from mobile device 104, first network 106 and/or second network 108. All such embodiments are envisaged.

Turning again to FIG. 7, as shown, network 700 can include PCRF component 702, which can receive user profile information (e.g., subscriber profile information) from HSS 706 and can access and/or store policy rule information. MRC component 708 can receive the profile information and the policy rule information from PCRF component 702. Repetitive description of like elements employed in respective embodiments of systems and/or apparatus described herein are omitted for sake of brevity.

Loading information for network 700 can be exchanged between RATs (e.g., first network 106, second network 108) and RNC component 704. For example, loading information can be received from an access point for first network 106 and from an access point for second network 108. Loading information about UMTS and other RATs collected by RNC component 704 can be employed by MRC component 708 to make a RAT selection decision. MRC component 708 can then inform mobile device 104 of the decision. MRC component 708 can then inform mobile device 104 of the decision via radio access networks. User traffic for mobile device 104 can then be directed to the selected RAT as between first network 106 and, in case of LTE, second network 108, or the third network RNC component 704 and corresponding NB. In some embodiments, mobile device 104 can provide its mobility state and quality of experience feedback about past end user experience to the network 700. MRC component 708 can then use the information received from the mobile device for future RAT determination.

In some embodiments, mobile device 104 can also provide loading information about the second network 108 based on information that mobile device 104 may determine or receive during communication via second network 108. The information can be provided from mobile device 104 to first network 106 (or vice versa) in various embodiments.

Figure 8:
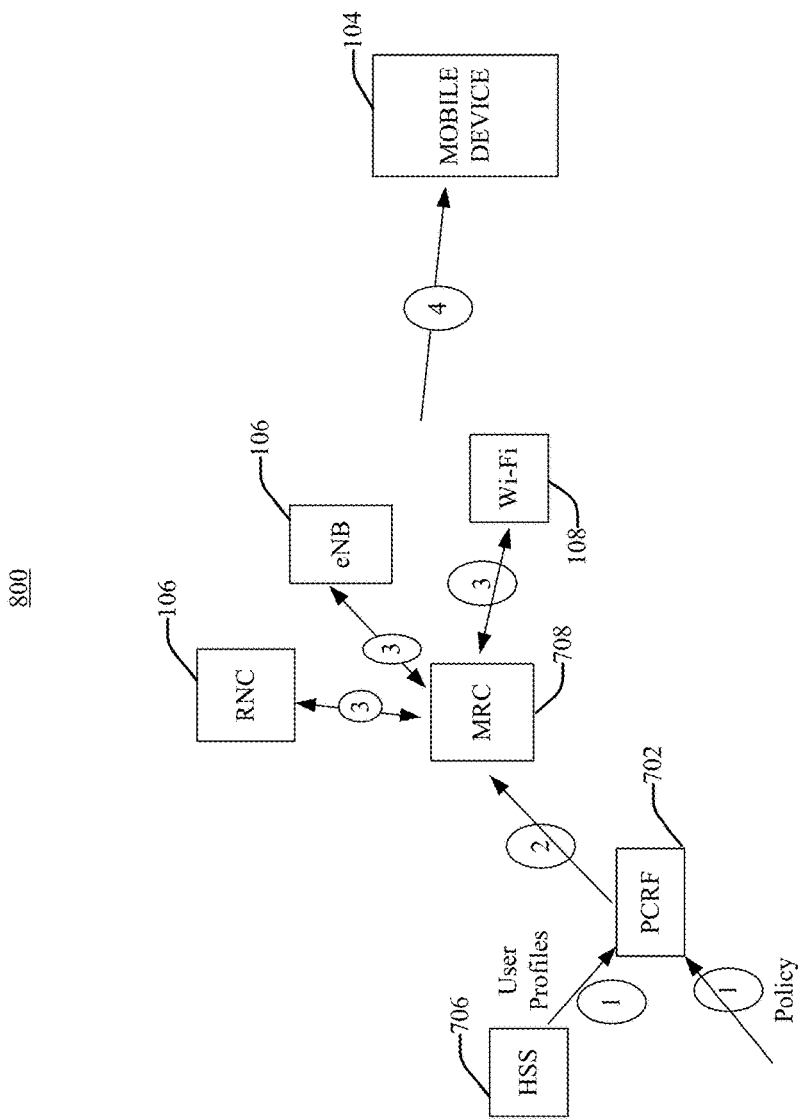
FIG. 8 illustrates an example block diagram of a system configured to facilitate intelligent radio access control via network integrated decision-making in accordance with one or more embodiments described herein.

Turning now to FIG. 8, shown is an example block diagram of a system configured to facilitate intelligent radio access control via network integrated decision-making in accordance with one or more embodiments described herein. Network 800 makes an integrated decision in which MRC component 708 makes an RAT decision based on receipt of network, and mobile device information. Repetitive description of like elements employed in respective embodiments of systems and/or apparatus described herein are omitted for sake of brevity.

In the embodiment shown, policy rules and user profile information are received by PCRF component 702 and the information is provided to MRC component 708 from PCRF component 702. MRC component 708 can also receive information from one or more RATs (e.g., first network 106 and second network 108), and RNC component 704, regarding network condition, and makes a decision regarding RAT for use by mobile device 104. Mobile device 104 can receive information indicating the selected RAT. In this embodiment, MRC component 708 can also perform common signaling/control functions for network selection.

Figure 9:
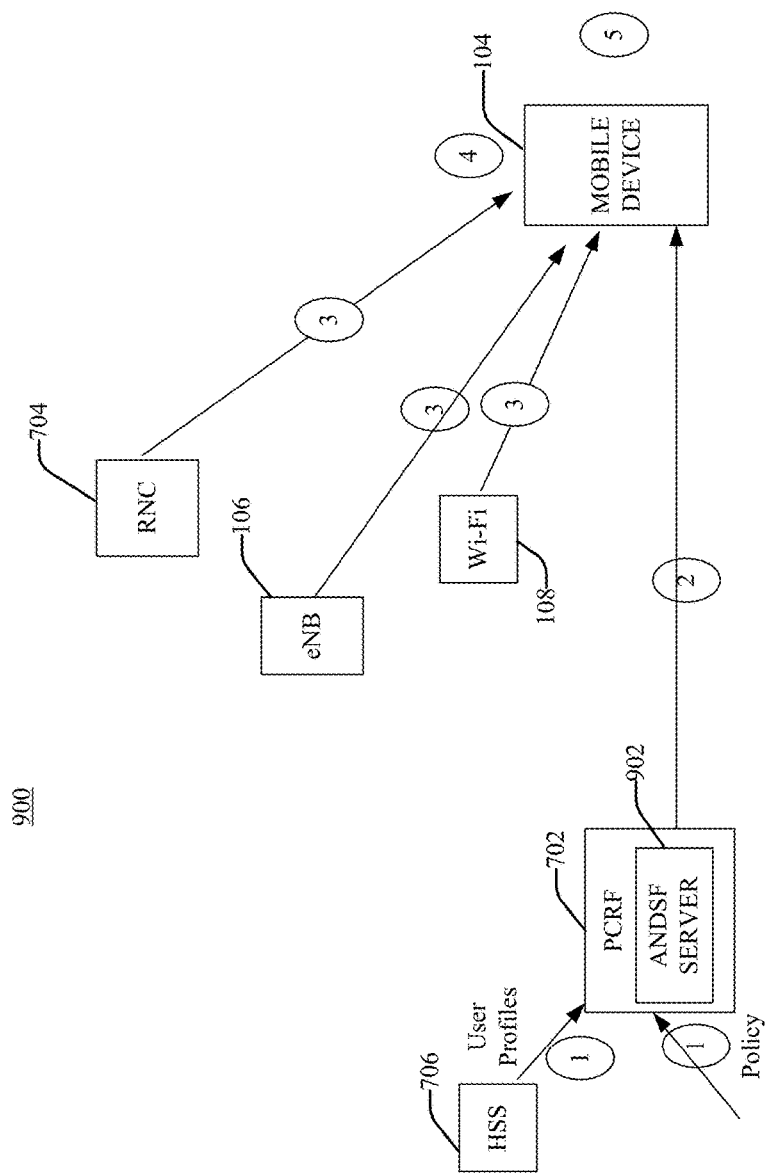
FIG. 9 illustrates an example block diagram of a system configured to facilitate intelligent radio access control via mobile device decision-making in accordance with one or more embodiments described herein.

FIG. 9 illustrates an example block diagram of a system configured to facilitate intelligent radio access control. In network 900, mobile device 104 performs selection of RAT in accordance with one or more embodiments described herein. In this embodiment, mobile device 104 makes the selection of RAT based on policy rule information, network conditions and/or mobile device information. Specifically, policy rules and user profile information are received at PCRF component 702. An access network discovery and selection function (ANDSF) server 902 transmits the policy rules and user profile information to mobile device 104. While FIG. 9 illustrates ANDSF server 902 residing at PCRF component 702, in various embodiments, ANDSF server 902 can reside at other locations in network 900. Repetitive description of like elements employed in respective embodiments of systems and/or apparatus described herein are omitted for sake of brevity.

In some embodiments, in which second network 108 is a Wi-Fi network, Hot Spot 2.0 (HS 2.0) can be employed for Wi-Fi discovery by mobile device 104. In other embodiments, mobile device 104 can employ network discovery software to discover networks to which mobile device 104 can connect. Loading condition information is updated from one or more RATs (e.g., first network 106, second network 108) and provided to mobile device 104.

Network information can also be provided to mobile device 104 from RNC component 704. For example, in some embodiments, RNC component 704 can also provide information indicative of congestion in network 900. For example, an explicit congestion notification can be provided that indicates congestion detected by devices in the networks (e.g., routers) prior to queue overflows. Mobile device 104 makes the selection of RAT based on one or more types of the information received.

Figure 10:
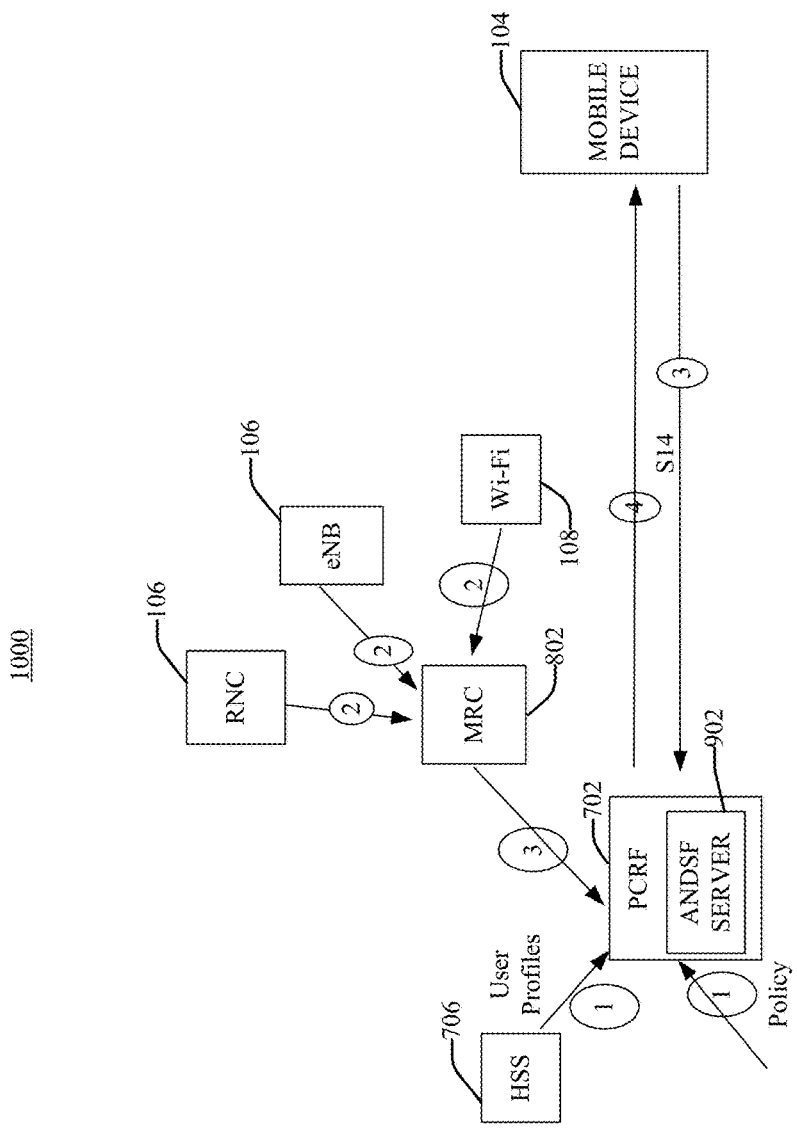
FIG. 10 illustrates an example block diagram of a system configured to facilitate intelligent radio access control via access network discovery and selection function decision-making in accordance with one or more embodiments described herein.

FIG. 10 illustrates an example block diagram of a system configured to facilitate intelligent radio access control. In network 1000, ANDSF server 902 selects RAT in accordance with one or more embodiments described herein. While FIG. 9 illustrates ANDSF server 902 residing at PCRF component 702, in various embodiments, ANDSF server 902 can reside at other locations in network 1000. Repetitive description of like elements employed in respective embodiments of systems and/or apparatus described herein are omitted for sake of brevity.

In this embodiment, an ANDSF server 902 makes the selection of RAT for mobile device 104 communication based on policy rules, network information and/or mobile device information. Specifically, policy rules and user profile information are received by PCRF component 702. MRC component 708 collects the load condition information from each RAT and from RNC component 704, and provides the information to ANDSF server 902. ANDSF server 902 is provided information on real-time conditions (e.g., RAT loading, mobile device mobility state and quality of end user experience). ANDSF server 902 makes the selection and outputs the information to mobile device 104.

Figure 11:
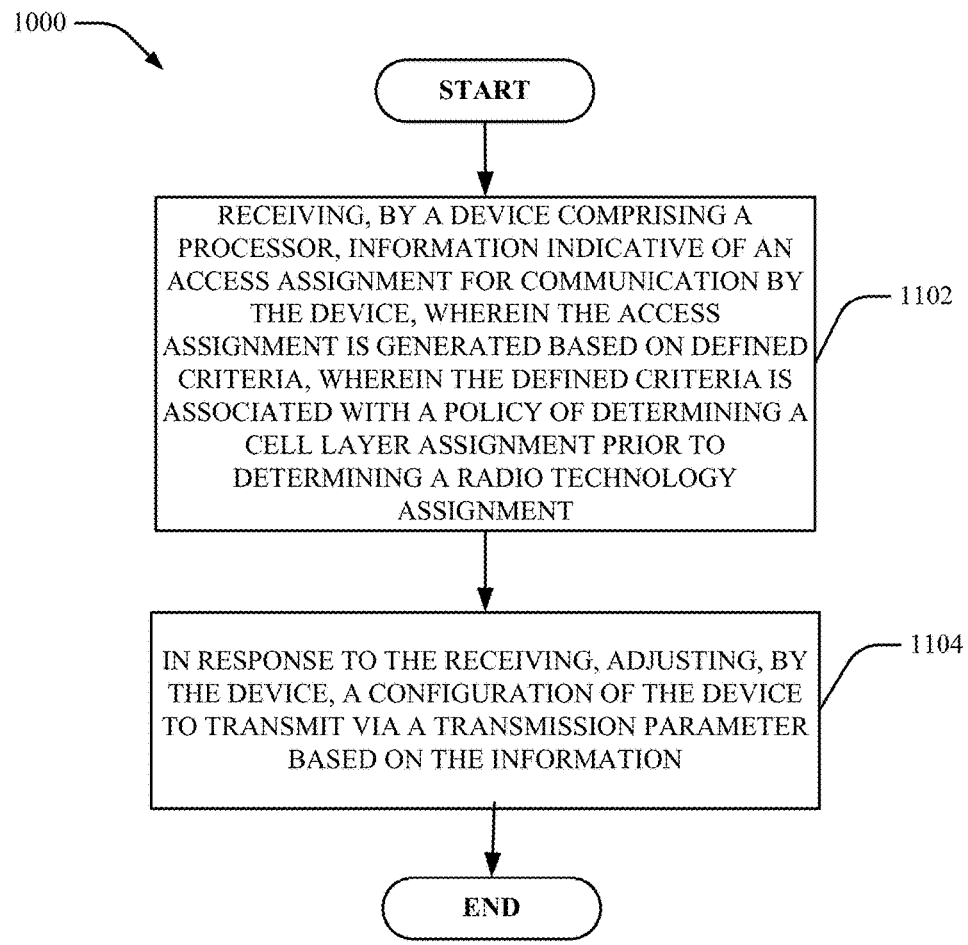
FIGS. 11-14 illustrate example flowcharts of methods that facilitate intelligent radio access control in accordance with one or more embodiments described herein.

FIGS. 11-14 illustrate example flowcharts of methods that facilitate intelligent radio access control in accordance with one or more embodiments described herein. Turning to FIG. 11, at 1102, method 1100 can include receiving, by a device comprising a processor, information indicative of an access assignment for communication by the device, wherein the access assignment is generated based on a defined criterion, wherein the defined criterion is associated with a policy of determining a cell layer assignment prior to determining a radio technology assignment.

In some embodiments, determining the cell layer assignment includes offloading a defined amount of traffic from a first cell device of a first cell layer to a second cell device of a second cell layer, wherein the first coverage area is larger than the second coverage area. The defined criterion can be based on a number of different factors including, but not limited to, mobility state of the device, diameter of the first coverage area, diameter of the second coverage area, application type executed on the device, end user preferences and/or quality of service purchased by the end user.

At 1104, method 1100 can include, in response to the receiving, adjusting, by the device, a configuration of the device to transmit via a transmission parameter based on the information.

Figure 12:
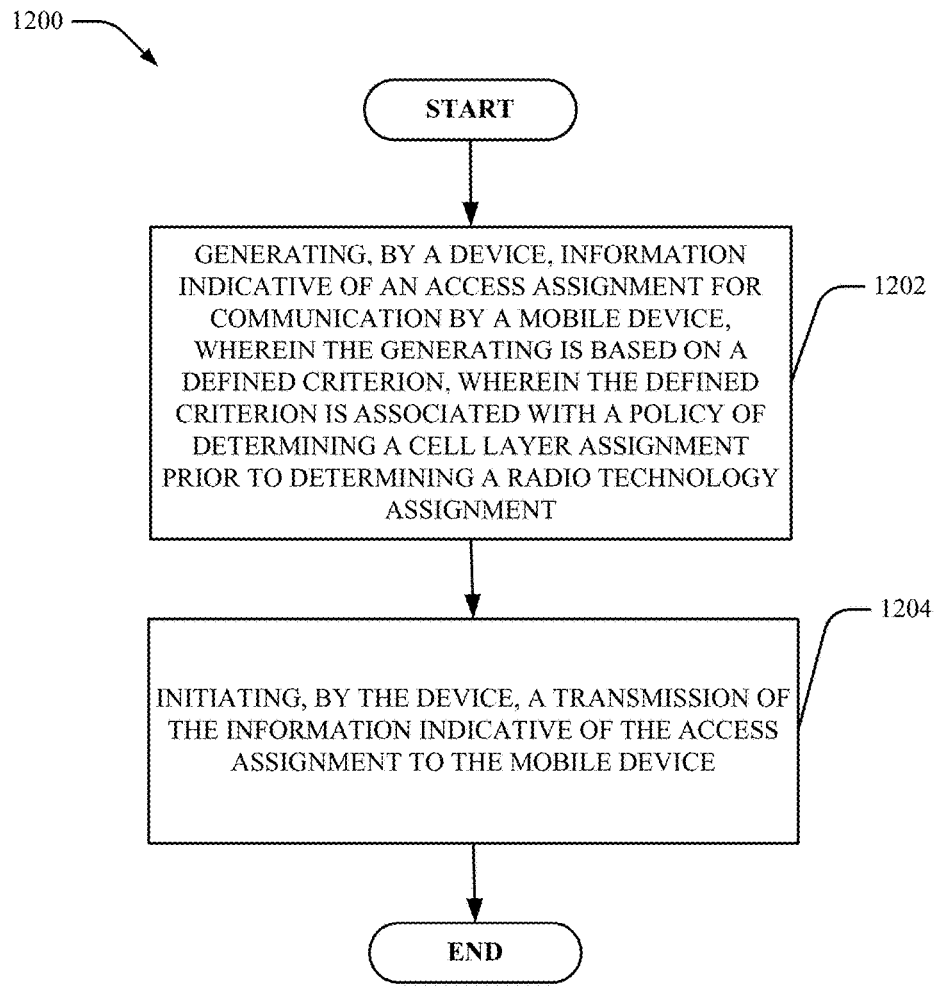

Turning now to FIG. 12, at 1202, method 1200 can include generating, by a device, information indicative of an access assignment for communication by a mobile device, wherein the generating is based on a defined criterion, wherein the defined criterion is associated with a policy of determining a cell layer assignment prior to determining a radio technology assignment.

At 1204, method 1200 can include initiating, by the device, a transmission of the information indicative of the access assignment to the mobile device.

Figure 13:
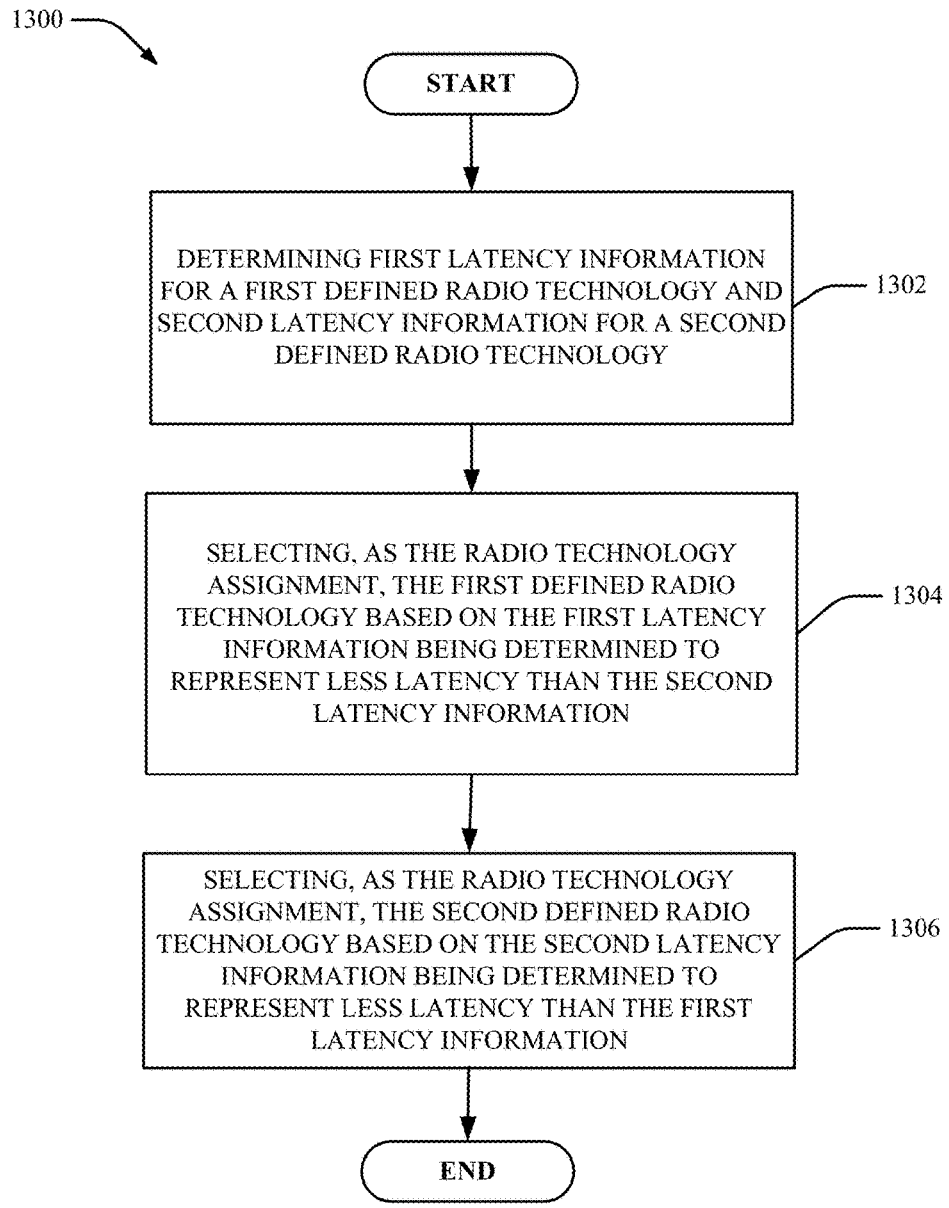

Turning now to FIG. 13, at 1302, method 1300 can include determining first latency information for a first defined radio technology and second latency information for a second defined radio technology. At 1304, method 1300 can include selecting, as the radio technology assignment, the first defined radio technology based on the first latency information being determined to represent less latency than the second latency information. At 1306, method 1300 can include selecting, as the radio technology assignment, the second defined radio technology based on the second latency information being determined to represent less latency than the first latency information.

Figure 14:
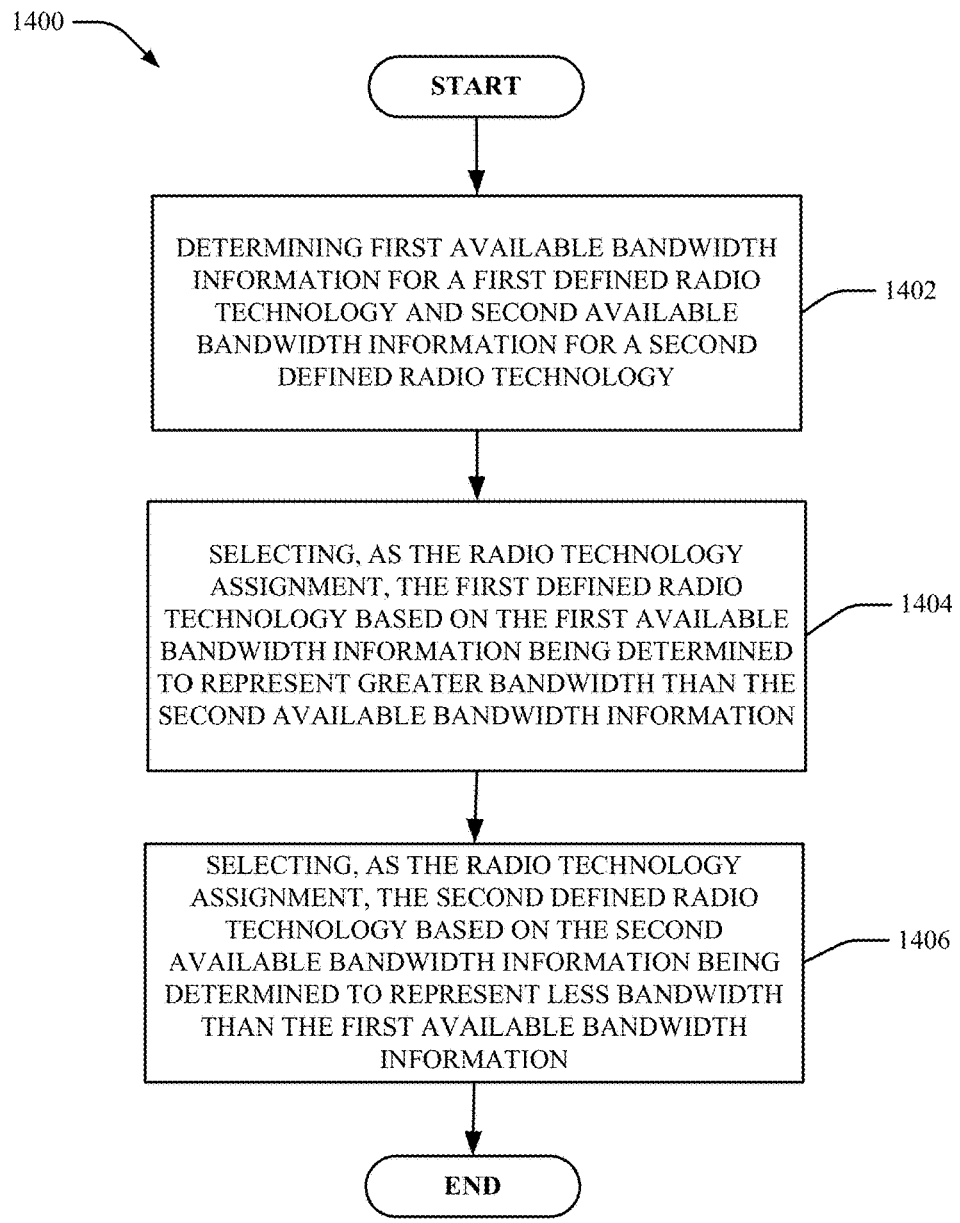

Turning now to FIG. 14, at 1402, method 1400 can include determining first available bandwidth information for a first defined radio technology and second available bandwidth information for a second defined radio technology. At 1404, method 1400 can include selecting, as the radio technology assignment, the first defined radio technology based on the first available bandwidth information being determined to represent greater bandwidth than the second available bandwidth information. At 1406, method selecting, as the radio technology assignment, the second defined radio technology based on the second available bandwidth information being determined to represent less bandwidth than the first available bandwidth information.

Figure 15:
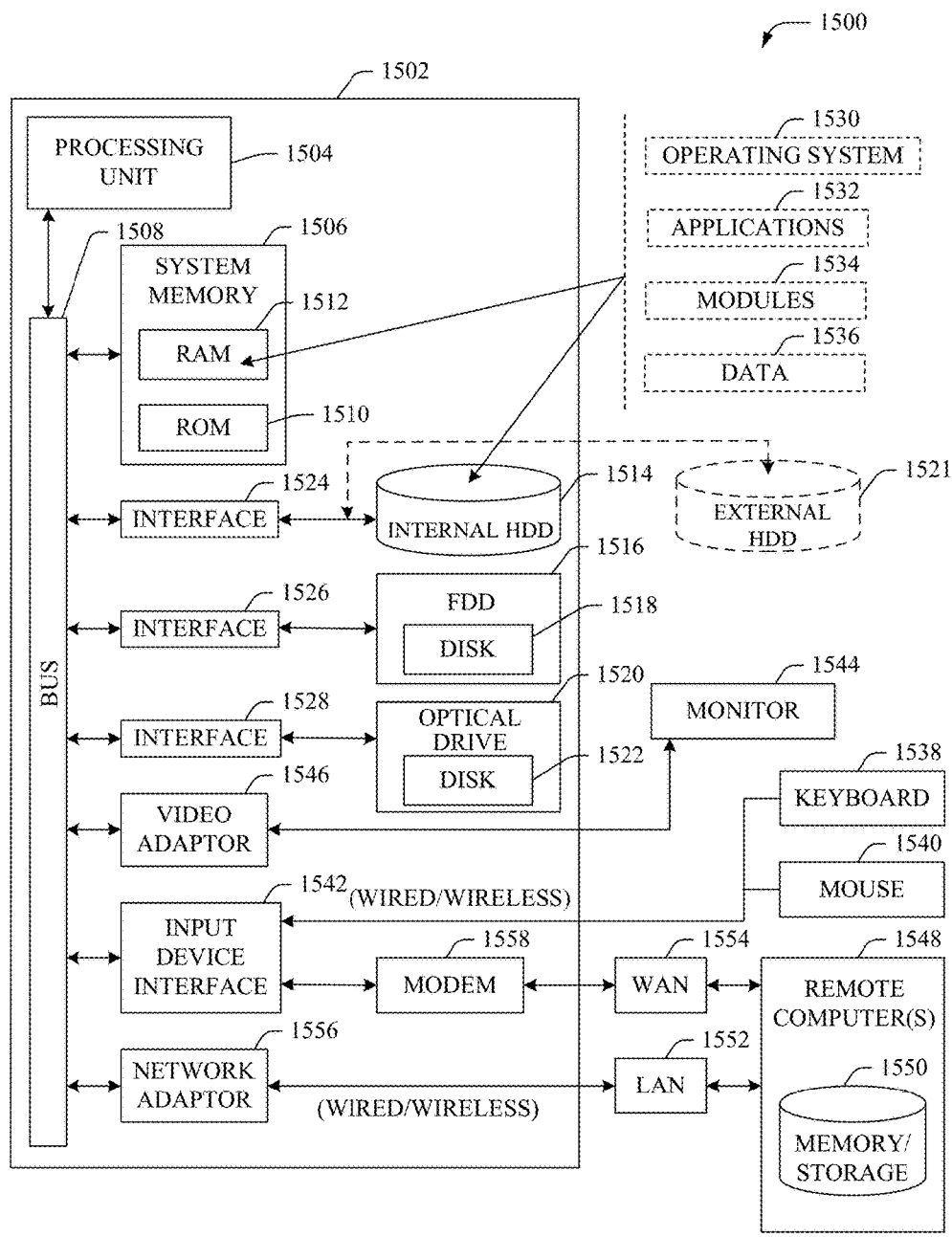
FIG. 15 illustrates a block diagram of a computer operable to facilitate intelligent radio access control in accordance with one or more embodiments described herein.

FIG. 15 illustrates a block diagram of a computer operable to facilitate intelligent radio access control in accordance with one or more embodiments described herein. For example, in some embodiments, the computer can be or be included within controller device 102, mobile devices 104, 106 and/or PCRF component 702, RNC component 704, HSS 706 and/or ANDSF server 902.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller device), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). In some embodiments, computer 1502 can include external HDD 1521. The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

A mobile device can enter commands and information into the computer 1502 through one or more wired/wireless input devices, e.g., a keyboard 1538 and a pointing device, such as a mouse 1540. Other input devices (not shown) can include a microphone, an infrared (IR) remote control, a joystick, a game pad, a stylus pen, touch screen or the like. These and other input devices are often connected to the processing unit 1504 through an input device interface 1542 that can be coupled to the system bus 1508, but can be connected by other interfaces, such as a parallel port, an IEEE 1394 serial port, a game port, a universal serial bus (USB) port, an IR interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless AP disposed thereon for communicating with the wireless adapter 1556.

When used in a WAN networking environment, the computer 1502 can include a modem 1558 or can be connected to a communications server on the WAN 1554 or has other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller device (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. The values and units of time provided herein are mere examples and any number of different values and units of time can be employed. All such variations are envisaged. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
obtaining, by a device comprising a processor, information indicative of an access assignment for a radio technology assignment, wherein the access assignment is based on a cell layer assignment determined prior to determining the access assignment for the radio technology assignment, wherein a policy of determining the radio technology assignment comprises a policy of selecting, as the radio technology assignment, a first defined radio technology based on a first condition of a first coverage area being determined to be less than a second condition of a second coverage area and a mobility state of the device being determined to be less than a defined threshold, and wherein the cell layer assignment is associated with a defined amount of traffic to offload from a first cell device of a first cell layer to a second cell device of a second cell layer; and
in response to the obtaining, adjusting, by the device, a configuration of the device to transmit according to a transmission parameter based on the information.

2. The method of claim 1, wherein the first condition comprises a first diameter and the second condition comprises a second diameter wherein the second coverage area is determined to be larger than the first coverage area.

3. The method of claim 1, wherein the mobility state represents a state of motion determined to be associated with the device.

4. The method of claim 1, wherein the determination of the radio technology assignment is generated based on profile information for a subscriber identity associated with the device.

5. The method of claim 1, wherein the mobility state represents a speed determined to be associated with the device.

6. An apparatus, comprising:
a processor; and
a memory that stores executable instructions that, when executed by the processor, facilitate performance of operations, comprising:
determining information indicative of an access assignment for a radio technology, wherein the access assignment is based on determining a cell layer assignment prior to determining assignment of the radio technology, and wherein the determining the radio technology comprises selecting a first defined radio technology protocol based on a first condition of a first coverage area being determined to be less than a second condition of a second coverage area different than the first coverage area, wherein the cell layer assignment is associated with a defined amount of traffic to offload from a first cell device of a first cell layer to a second cell device of a second cell layer; and
in response to the determining the information, adjusting a configuration of the apparatus to transmit according to a transmission parameter based on the information.

7. The apparatus of claim 6, wherein the determining the radio technology is further based on whether a defined criterion associated with a mobility state of the apparatus is satisfied.

8. The apparatus of the claim 7, wherein the defined criterion comprises the mobility state being determined to be less than a defined threshold.

9. The apparatus of claim 6, wherein the access assignment is generated based on the cell layer assignment.

10. The apparatus of claim 9, wherein the second cell device is different than the first cell device.

11. The apparatus of claim 6, wherein the determining the radio technology further comprises:
selecting, as the radio technology, a second defined radio technology protocol based on a second latency of the second defined radio technology being determined to be less than a first latency of the first defined radio technology.

12. The apparatus of claim 6, wherein the access assignment is further based on profile information for a subscriber identity associated with the apparatus.

13. The apparatus of claim 7, wherein the mobility state represents a state of movement determined to be associated with the apparatus.

14. The apparatus of claim 10, wherein the access assignment is further based on respective load conditions of the first cell device and the second cell device.

15. A method, comprising:
generating, by a device comprising a processor, information indicative of an access assignment for communication by a mobile device based on determining a radio technology assignment, wherein the determining the radio technology assignment comprises selecting, as the radio technology assignment, a first defined radio technology based on a first condition of a first coverage area being determined to be less than a second condition of a second coverage area and a mobility state of the mobile device being determined to be less than a defined threshold, wherein the access assignment is based on a cell layer assignment determined prior to the determining of the radio technology assignment, and wherein the cell layer assignment is associated with a defined amount of traffic to offload from a first cell device of a first cell layer to a second cell device of a second cell layer; and initiating, by the device, a transmission of the information to the mobile device.

16. The method of claim 15, wherein the access assignment is further based on a policy of determining the cell layer assignment prior to the determining the radio technology assignment.

17. The method of claim 16, wherein the determining the radio technology assignment further comprises:

determining a defined latency threshold for an application executing on the mobile device.

18. The method of claim 17, wherein the determining the radio technology assignment further comprises:

determining first latency information for the first defined radio technology and determining second latency information for a second defined radio technology.

19. The method of claim 15, wherein the access assignment is further based on profile information for a subscriber identity associated with the device.

20. The method of claim 18, wherein the determining the radio technology assignment further comprises:

selecting, as the radio technology assignment, the second defined radio technology based on the first latency information being determined to be greater than the defined latency threshold.

* * * * *